United States Patent
Vargas et al.

(10) Patent No.: US 9,454,546 B2
(45) Date of Patent: *Sep. 27, 2016

(54) FILTERING INVENTORY OBJECTS USING IMAGES IN AN RFID SYSTEM

(71) Applicant: HAND HELD PRODUCTS, INC., Fort Mill, SC (US)

(72) Inventors: Joseph Vargas, Santa Fe, NM (US); Tom Plocher, Hugo, MN (US); Sriharsha Putrevu, Minneapolis, MN (US); Ynjiun Wang, Cupertino, CA (US)

(73) Assignee: HAND HELD PRODUCTS, IN.C, Fort Mills, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,038

(22) Filed: Dec. 10, 2015

(65) Prior Publication Data
US 2016/0098427 A1    Apr. 7, 2016

Related U.S. Application Data

(63) Continuation of application No. 14/276,556, filed on May 13, 2014, now Pat. No. 9,213,960.

(60) Provisional application No. 61/840,209, filed on Jun. 27, 2013.

(51) Int. Cl.
| | |
|---|---|
| *G06F 19/00* | (2011.01) |
| *G06F 17/30* | (2006.01) |
| *G06Q 10/08* | (2012.01) |
| *G06K 7/10* | (2006.01) |
| *G06K 17/00* | (2006.01) |
| *H04B 5/00* | (2006.01) |

(52) U.S. Cl.
CPC ..... *G06F 17/30277* (2013.01); *G06K 7/10366* (2013.01); *G06K 7/10386* (2013.01); *G06K 17/0022* (2013.01); *G06Q 10/087* (2013.01); *H04B 5/0062* (2013.01); *H04B 5/0068* (2013.01)

(58) Field of Classification Search
CPC ....... G07F 7/1008; G07F 7/08; G06Q 30/02; G06Q 20/342; G06Q 30/06; G06Q 20/20; G06Q 10/087; G06Q 10/08
USPC ................................ 235/385, 375, 381, 383
See application file for complete search history.

(56) References Cited

U.S. PATENT DOCUMENTS

| | | | |
|---|---|---|---|
| 9,213,960 B2 * | 12/2015 | Vargas | ............... G06K 17/0022 |
| 2007/0080785 A1 | 4/2007 | Son et al. | |
| 2009/0037244 A1 | 2/2009 | Pemberton | |

OTHER PUBLICATIONS

Dec. 11, 2014 Search Report issued in European Application No. 14172632.3.

* cited by examiner

*Primary Examiner* — Karl D Frech
(74) *Attorney, Agent, or Firm* — Oliff PLC; R. Brian Drozd

(57) ABSTRACT

A method for filtering scanned objects displayed on a reader is provided. The reader may scan one or more transponders, and obtain, from a database, an image for each scanned transponder. Each transponder may be associated with an object (e.g., an item of retail inventory). The obtained image for each object may be presented on an interface, and a selection of an object category may be received using the obtained images. A determination may be made as to which objects are associated with the selected object category. A display screen may display data associated with only the objects associated with the selected object category.

17 Claims, 7 Drawing Sheets

FILTERING INVENTORY OBJECTS USING IMAGES IN AN RFID SYSTEM

CROSS REFERENCE TO RELATED APPLICATIONS

This application is a continuation of U.S. patent application Ser. No. 14/276,556, filed May 13, 2014, which claims benefit of U.S. Provisional Patent Application No. 61/840,209, filed Jun. 27, 2013, which is incorporated herein by reference in its entirety.

BACKGROUND

Radio-frequency identifier (RFID) methods are widely used for a number of tasks, including smart cards, supporting maintenance tasks, identification badges, tracking objects in manufacturing, retail inventory management, etc. An RFID tag can be attached, e.g., to an inventory object. An encoded information reading (EIR) terminal can be configured to read the memory of an RFID tag attached to an inventory object.

Current RFID operations do not have a way to take reliable inventory counts. Current RFID methods for inventory counting require pre-determined lists of expected inventory to check against. This is necessary because of the nature of RFID, and more specifically, radio waves. When an RF device is being used to scan items, interrogation signals are emitted out from the reader and spread ambiguously throughout the workspace. There is no way to be positive where the interrogation signals are going, or know (with an adequate level of precision) the depth of a particular scan. There are many environmental factors that contribute to this. One common obstacle to reliable and consistent RF scanning is metal. Metal fixtures and building material cause interference and can severely change the nature of a scan—making it impossible to know for certain what the coverage area is. Due to this, it is common to reconcile (positively register a scan of an item) unwanted items. For example, if one is attempting to scan a shelf in order to obtain a count of jeans that sit on the shelf they may also accidentally scan nearby shirts, socks or other items (located on adjacent shelves). This limitation has reduced effectiveness and a lowered user experience.

SUMMARY

To address the above issues, methods and systems are provided. In one aspect, a method includes a reader scanning one or more transponders, and obtaining, from a database, an image for each transponder. Each transponder may be associated with an object (e.g., an item of retail inventory). The obtained image for each object is presented on an interface, and a selection of an object category is received using the obtained images. A determination is made as to which objects are associated with the selected object category. A display screen displays data associated with only the objects associated with the selected object category.

In another aspect, a method of processing transponder signals received from transponders to identify the transponders is provided. A first signal including a first code and a first identifier may be received from a first transponder. The first identifier is written to the first transponder by an RFID writer when the first transponder is placed proximate to the RFID writer, and the first identifier is used to associate transponders with a first user. A second signal including a second code and the first identifier may be received from a second transponder. The first identifier is also written to the second transponder by the RFID writer when the second transponder is placed proximate to the RFID writer. The first and second transponders are associated with the first user based on receiving the first identifier from both the first and second transponders.

In another embodiment, a method includes presenting an image on an interface of a reader. The image may be associated with a category and an object. A selection of the category is received via the interface, and a reader scans a transponder in an area where the transponder is associated with the object. A category associated with the transponder is determined, and the transponder is displayed on a display screen of the reader only in response thereto.

In yet another embodiment, a system is provided that may include an interface, a scanner and a display. The scanner may be configured to scan one or more transponders, where the one or more transponders are associated with objects disposed on a fixture. The display may be configured to display the interface. An image for each object is obtained from a database, and the obtained image is presented for each object on the interface. A selection of an object category is received using the obtained images, and a determination is made as to which objects are associated with the selected object category. The display displays data associated with only the objects associated with the selected object category.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of embodiments of the invention. In the drawings, like numerals are used to indicate like parts throughout the various views.

DETAILED DESCRIPTION OF THE EMBODIMENTS

Figure 1A:
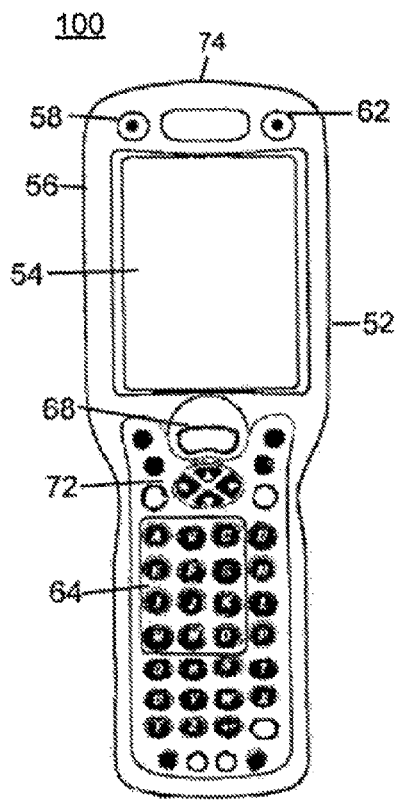
FIGS. 1A-1C schematically illustrate a reading terminal, according to one embodiment.

The exemplary embodiments described herein provide detail for illustrative purposes and are subject to many variations in structure and design. It should be emphasized, however, that the present invention is not limited to a particularly disclosed embodiment shown or described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "a," "an," and "the" herein do not denote a limitation of quantity, but rather denote the presence of at least one of the referenced object. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, as will be appreciated by one skilled in the art, aspects of the present disclosure may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In retail facilities, it is common for objects to be placed on a plurality of different fixtures. The fixtures can be, for example, shelving units, linear clothing racks, non-linear clothing racks, tables with one or more surfaces, or any combination thereof. Employees are often tasked to periodically determine the current status of inventory within the facility. One option for determining inventory status is to tag each object with an RFID tag and for an employee to approach a fixture with a reading terminal that includes a processor, a memory, a scanning device, a motion sensing device such as an Inertial Measurement Unit (IMU), a communication interface, and a camera system. The employee moves reading terminal with respect to the fixture to detect the presence of one or more objects arranged on the fixture.

In one embodiment, there is provided a reader or reading terminal, comprising a radio frequency identifier (RFID) reading device. The reading terminal can be configured to read decodable indicia such as RFID tags containing encoded messages. In one embodiment, the reading terminal can be configured to read an RFID tag containing an encoded message and output raw message data containing the encoded message. In another embodiment, the reading terminal can be configured to read an RFID tag containing an encoded message and output decoded message data corresponding to the encoded message.

It should be noted that the terms "reading terminal" and "reader" may be used interchangeably herein. A reader may be a transponder reader, such as a RFID reader, an encoded information reading (EIR) terminal, or any other device which is configured to read data associated with an object from a transponder (e.g., a RFID tag or other information-providing device (e.g., barcode, etc.)).

Various embodiments of the reading terminal can be used in a numerous applications, including but not limited to, authentication and access control systems (for example, using smart cards), object tracking in manufacturing and retail, etc. A smart card is an identification card (e.g., a credit card, a pass card) which does not need to be swiped or otherwise physically contacted by a card reader. This capability can be implemented by placing an RFID tag in the card. Object tracking can be implemented by placing an RFID tag on each individual object. In retail, object tracking with RFID tags can be used in conjunction with other technologies such as bar code scanning and payment terminals. Object tracking with RFID tags can be used in loss prevention systems by placing an RFID tag into merchandise objects and placing sensors at exit points. If an exit sensor detects a tagged object with a tag, which was not deactivated at the checkout, an alarm can go off.

One embodiment of reading terminal 100 is shown in FIGS. 1A (front panel view), 1B (side panel view), and 1C (bottom panel view). reading terminal 100 can comprise housing 52 within which other components of reading terminal 100 can be disposed. LCD screen display with touch screen sensor 54 can be disposed on the front panel 56. Also disposed on front panel 56 can be decode LED 58, scan led 62, and keyboard 64 including scan key 68 and navigation keys 72. Camera lens 74 of the camera system 353 can be disposed on the top panel of housing 52. Disposed on the side panel (best viewed in FIG. 1B) can be infrared communication port 76, access door to a secure digital (SD) memory interface 78, audio jack 80, and hand strap 82. Disposed on the bottom panel (best viewed in FIG. 1C) can be multi-pin mechanical connector 84 and hand strap clip 86.

Figure 1B:
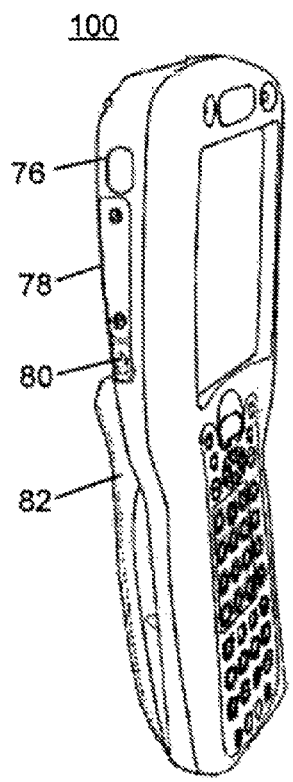
Figure 1C:
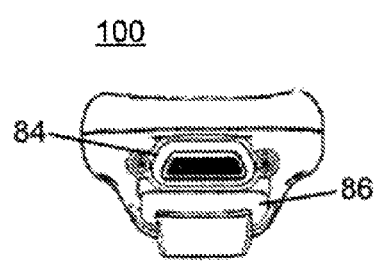

While FIGS. 1A-1C illustrate a hand held housing, a skilled artisan would appreciate the fact that other types and form factors of terminal housings are within the scope of this disclosure.

Figure 2:
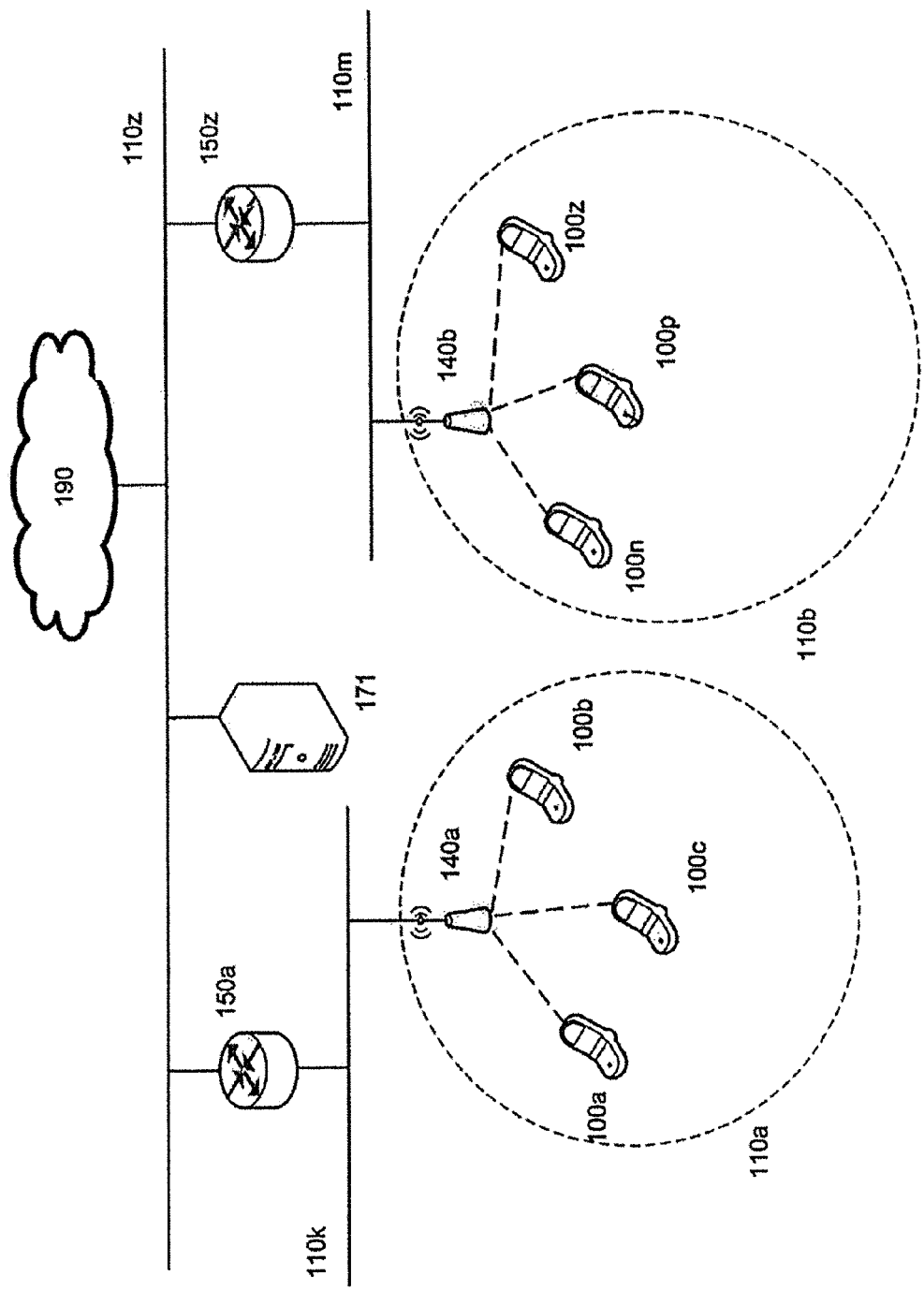
FIG. 2 depicts a network-level layout of a data collection system utilizing reading terminals, according to one embodiment.

In a further aspect, the reading terminal can be incorporated in a data collection system. The data collection system, schematically shown in FIG. 2, can include a plurality of routers 150a-150z, a plurality of access points 140a-140z, and a plurality of reading terminals 100a-100z in communication with a plurality of interconnected networks 110a-110z. In one aspect, the plurality of networks 110a-110z can include at least one wireless communication network. In a further aspect, a reading terminal can comprise a communication interface which can be used by the terminal to connect to one or more networks 110a-110z. In one embodiment, the communication interface can be provided by a wireless communication interface.

The reading terminal 100c can establish a communication session with the host computer 171. In one embodiment, network frames can be exchanged by the reading terminal 100c and the host computer 171 via one or more routers 150, base stations, and other infrastructure elements. In another embodiment, the host computer 171 can be reachable by the reading terminal 100c via a network 190, such as a local area network (LAN). In a yet another embodiment, the host computer 171 can be reachable by the reading terminal 100c via a network 190, such as a wide area network (WAN). A skilled artisan would appreciate the fact that other methods of providing interconnectivity between the reading terminal 100c and the host computer 171 relying upon LANs, WANs, virtual private networks (VPNs), and/or other types of network are within the scope of this disclosure.

In one embodiment, the communications between the reading terminal 100c and the host computer 171 can comprise a series of HTTP requests and responses transmitted over one or more TCP connections. In one embodiment, the communications between the reading terminal 100c and the host computer 171 can comprise VoIP traffic transmitted over one or more TCP and/or UDP ports. A skilled artisan would appreciate the fact that using other transport and application level protocols is within the scope and the spirit of the invention.

In one aspect, at least one of the messages transmitted by the reading terminal can include decoded message data obtained from decodable indicia 600 (e.g., a bar code label or an RFID label) attached to a product or to a shipment object. For example, a reading terminal can transmit a request to the host computer to retrieve product information corresponding to a product identifier encoded by a bar code label attached to the product, or to transmit a product tracking record for a product identified by a bar code label attached to the product.

Figure 3:
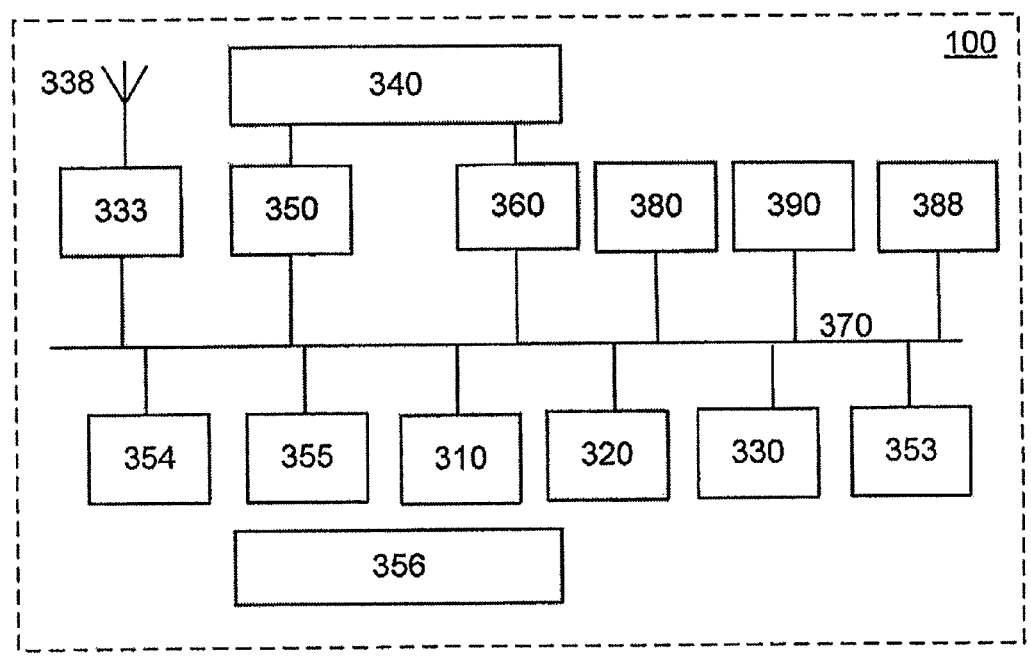
FIG. 3 depicts component-level layout of a reading terminal, according to one embodiment.

Component-level diagram of one embodiment of a reading terminal is now being described with references to FIG. 3. Reading terminal 100 can comprise at least one microprocessor 310 and a memory 320, both coupled to the system bus 370. In one embodiment, memory 320 may store a database. The microprocessor 310 can be provided by a general purpose microprocessor or by a specialized microprocessor (e.g., an ASIC). In one embodiment, reading terminal 100 can comprise a single microprocessor which can be referred to as a central processing unit (CPU). In another embodiment, reading terminal 100 can comprise two or more microprocessors, for example, a CPU providing some or most of the reading terminal functionality and a specialized microprocessor performing some specific functionality. A skilled artisan would appreciate the fact that other schemes of processing tasks distribution among two or more microprocessors are within the scope of this disclosure.

Reading terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family. Module 360 is an additional modular component that can replaced with upgraded or expanded modules and is disposed between the system bus 370 and communication interface 340. This module 360 is compatible with, for example, auxiliary hard drives (including flash memory), RAM, communication interfaces, etc.

Reading terminal 100 can further comprise a camera system 353 and an image interpretation and processing module 388. In one embodiment, the image interpretation and processing module 388 receives image data from camera system 353.

Reading terminal 100 can further comprise a keyboard interface 354 and a display adapter 355, both also coupled to the system bus 370. Reading terminal 100 can further comprise a battery 356. In one embodiment, the battery 356 can be provided by a replaceable rechargeable battery pack.

Reading terminal 100 can further comprise a GPS receiver 380. Reading terminal 100 can further comprise at least one connector 390 configured to receive a subscriber identity module (SIM) card.

Reading terminal 100 can further comprise one or more EIR devices 330, provided, for example, but not limited to, by an RFID reading device, a bar code reading device, or a card reading device. In one embodiment, the RFID terminal can be configured to read an encoded message from a decodable indicia using EIR device 330, and to output raw message data containing the encoded message. In another embodiment, the RFID terminal can be configured to read an encoded message from a decodable indicia using EIR device 330, and to output decoded message data corresponding to the encoded message. As used herein, "message" is intended to denote a character string comprising alphanumeric and/or non-alphanumeric characters. An encoded message can be used to convey information, such as identification of the source and the model of a product, for example, in a UPC code.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of this disclosure.

As noted herein supra, in one embodiment, reading terminal 100 can further comprise an RFID reading device 333. Reading terminal 100 can be configured to read RFID tags containing decoded messages. In one embodiment, the RFID terminal can be configured to read, using RFID reading device 333, an RFID tag containing an encoded message, and to output raw message data containing the encoded message. In another embodiment, the RFID terminal can be configured to read, using RFID reading device 333, an RFID tag containing an encoded message, and to output decoded message data corresponding to the encoded message.

In a further aspect, the RFID reading device can comprise an antenna 338. Antenna 338 is configured to transmit and receive electromagnetic energy to and from an area within a reception area of the antenna. The antenna may be sized so as to transmit at a frequency used for RFID communications. The antenna may transmit interrogation signals and response signals returned by RFID tags.

Figure 4:
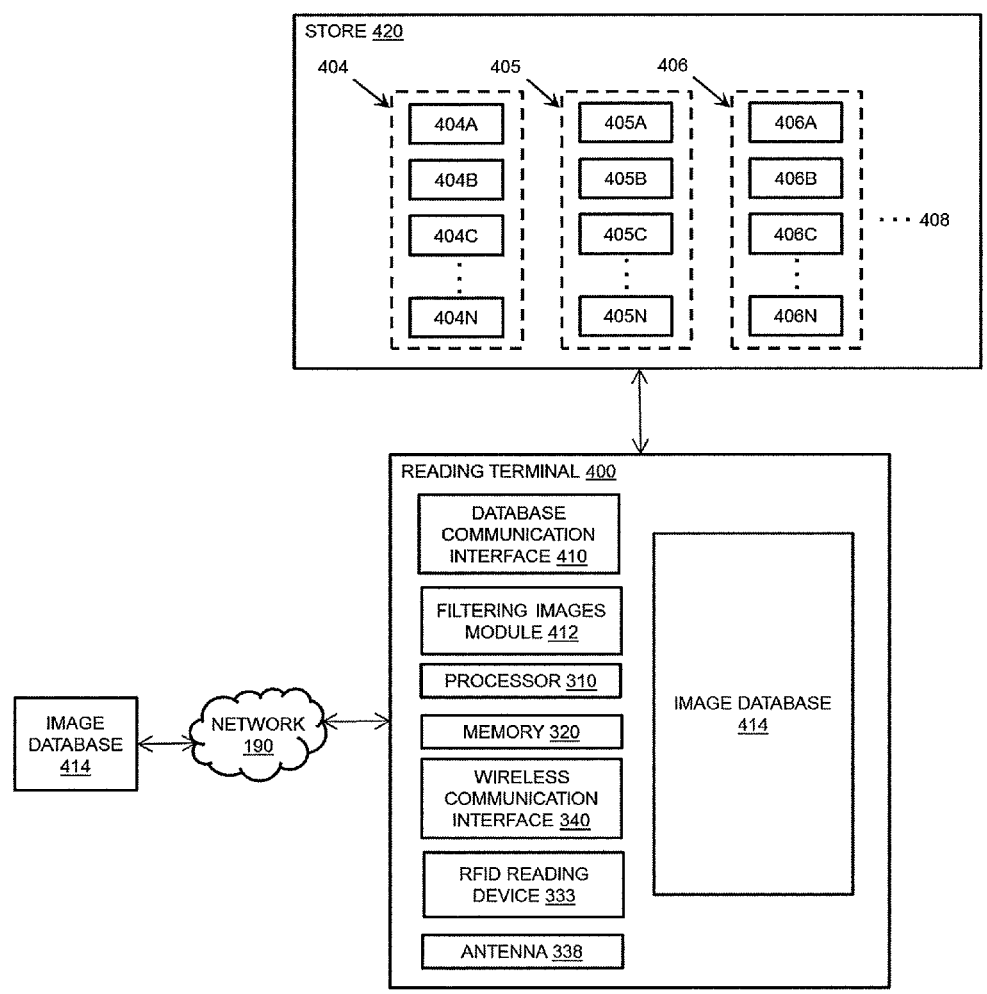
FIG. 4 schematically illustrates a system of filtering objects according to one embodiment.

FIG. 4 illustrates reading terminal 100 wirelessly interacting with transponders associated with a plurality of inventory objects (404A-404N, 405A-405N, 406A-406N, etc.). The inventory objects may be objects that are available for purchase in a retail establishment, such as clothing, perishable items, home items, etc. The inventory items in FIG. 4 are shown within categories 500A-500N, and categories 500A-500N can be of any type. For example, categories 500A-500N may each represent one of: a plurality of shelves on a fixture, a plurality of fixtures, a plurality of types of inventory objects (e.g., pants, shirts, socks, belts, hammers, saws, staplers etc.), a plurality of colors of inventory objects, a plurality of gender categories for inventory objects, a plurality of sizes of inventory objects (e.g., small, medium, large, etc.), a plurality of retail classifications (e.g., sale, clearance, restricted from sale to minors, etc.), a plurality of brand names of inventory objects, a plurality of price ranges, any other category, or any combination thereof. Furthermore, each inventory object 404 may be classified into more than one category. For example, inventory object 404A may be located on the "second shelf" of the "fourth fixture" and may be classified in the "red" color category and the "large" size category. A user may be allowed to combine multiple categories in a Boolean style operation. It should be noted that while FIG. 4 illustrates the objects 404A-N, 405A-N, 406A-N, and 408 as being categorized, it should be understood that these objects may be intermingled on the same fixture or on different fixtures. For example, jeans (e.g., 404A) and shirts (e.g., 405A) may both be on the same fixture (not shown in FIG. 4), and possibly on the same shelf or even somehow in the same pile of clothing on the fixture. Additionally, the objects of the same category (e.g., one or more objects 404A-N) may be placed on separate fixtures.

Data associated with the inventory objects may be stored in a database 414. For example, information associated with a pair of jeans may be a database entry stored in the database 414 having the category name for jeans, an identification code identifying the item as jeans, an image of jeans, and/or any other information related to the jeans. The database 414 includes database entries for each object on the fixture and each object is associated with the type/category of the object (e.g., jeans may be associated with the "jeans" category or "clothing" category). In some embodiments, an image is stored in each database entry based on the object type. For example, an image of jeans for jeans, an image of shirts for a shirt or a top, an image of a shirt for a t-shirt, and the like may be stored in the database for each respective object entry. In one embodiment, the database entry has a code stored in each database entry which is associated with an image. A series of images are stored in a database and are associated with each particular image.

The objects may be associated with multiple categories. For example, jeans may be categorized under general categories of "clothing," "pants," "jeans," "Company X products," etc. and/or may be categorized under a specific category specifically identifying the object "XXX jeans by Company X" or "product code #####."

In one embodiment, an image is associated with the object in the database for each corresponding category. Referring back to the above example, if jeans are associated with category "jeans" and category "pants," two images may be associated with the database entry for jeans. Thus, an image of jeans and a different image of pants may be associated with jeans in the database.

In one embodiment, the image may be an actual image of the jeans. For example, if the category is the specific description of the particular jeans (i.e., XXX jeans by Company X), the image may be of the actual jeans. However, it should be understood that generic images of the jeans may also be used and thus, generic images of the category may be used instead of actual pictures of the objects.

The reading terminal 100 may access a network 190 to access the database 402 which may be remote from the reading terminal 400. In addition, or alternatively, the reading terminal 400 may include the database 402. The reading terminal 400 may access one or both of these databases and communicate with these databases with the database communication interface 410 resident on the reading terminal.

It should be understood that reading terminal 400 may include the features and components of reading terminal 100. For example, reading terminal 400 of FIG. 4 may include a hardware processor 310, memory 320, a wireless communication interface 340, a RFID reading device 333, an antenna 338, and/or any other feature of reading terminal 100 of FIG. 3.

The reading terminal 400 also may include a filtering images module 412. The filtering images module 412 is configured to communicate with the database communication interface to obtain images from the image database 412. The filtering images module 412 is further configured to select the appropriate image from the image database based on certain parameters from the scan.

Figure 5:
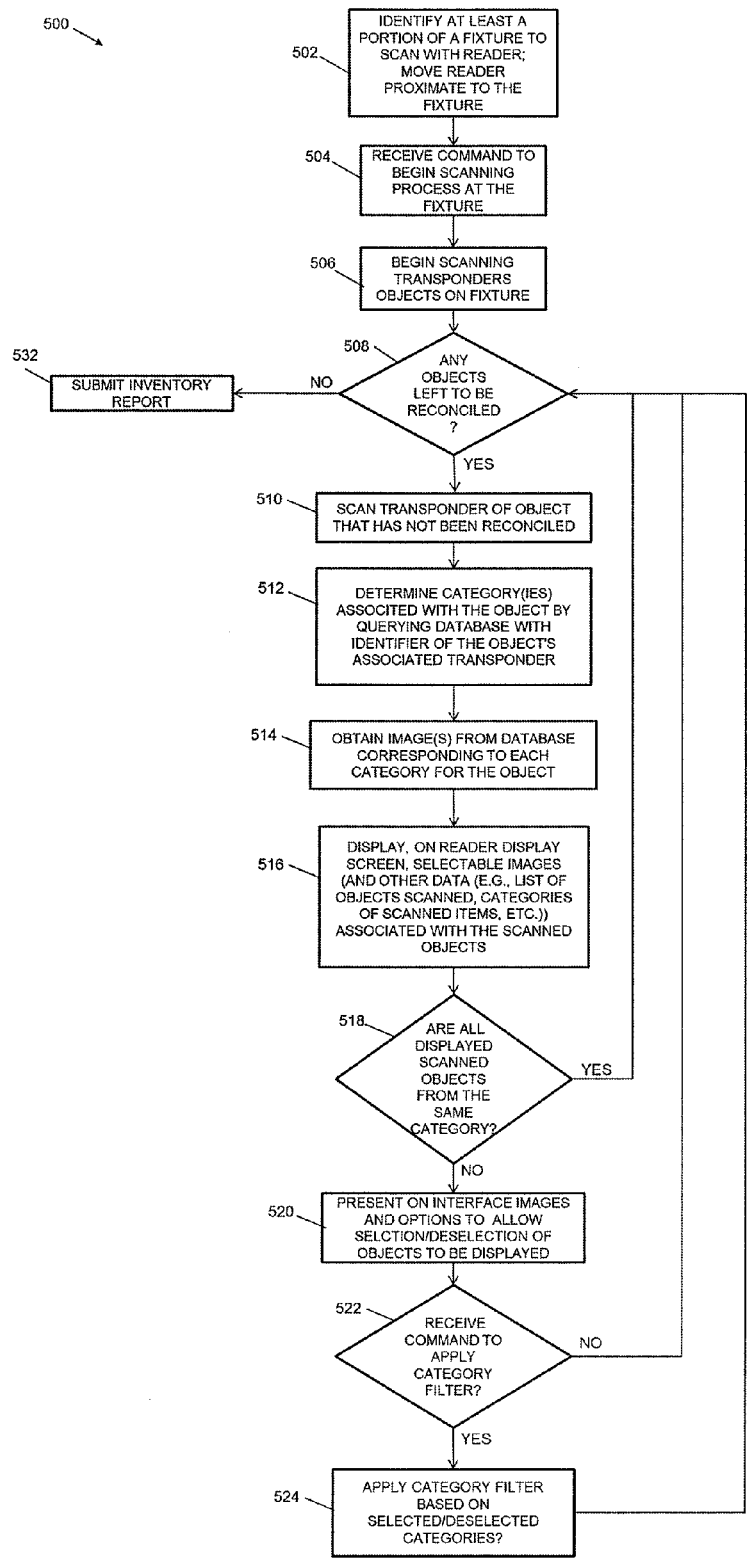
FIG. 5 is a flowchart filtering inventory objects using a reading terminal, according to one embodiment.

As shown in FIG. 5, in one embodiment, a user identifies a fixture and/or a portion of a fixture to scan (block 502). For example, an employee at a retail store may be tasked with inventorying jeans on shelf "15J." The employee physically moves the reading terminal 100 proximate to the shelf so that the shelf is within the scanning area of reading terminal 100. The reading terminal 100 may be moved into place prior to the scanning process or after the scanning has begun.

In block 504, the reading device 100 receives a command to begin scanning process at the fixture. The command may be a user activating a button indicating that the reading terminal should begin transmitting interrogation signals to RFID tags, for example. The reading terminal may be initialized so that all transponders of objects are marked as not reconciled or not yet scanned according to an embodiment. In response to receiving the command, the process 500 may proceed to block 506.

At 506, the reading terminal begins scanning an area about the fixture so that transponders associated with the inventory objects on the fixture may be scanned. It should be understood that the reading terminal may scan transponders using RFID signals or may scan using some other type of technology, such as scanning barcodes using a barcode scanner. In any event, the reading terminal receives scan data for items (e.g., RFID tags, barcodes, etc.) associated with the inventory or objects of interest.

It should be noted that the term objects is used herein broadly. In this regard, objects refers to physical items (e.g., retail store inventory items) which each have a transponder associated therewith and/or attached therewith, according to one embodiment.

In block 508, a determination is made as to whether any objects are left to be reconciled. Since the reading terminal 100 has begun scanning, none of the objects' transponders have been reconciled. However, when each object's transponder has been scanned and processed for each scanning session (i.e., each time process 500 is performed from start to finish), such transponder may be marked as scanned or reconciled and may not be scanned and processed again for the scanning session. If there are transponders left to be reconciled, the process 500 may proceed to 510; otherwise, the process 500 may proceed to 532 where an inventory report is submitted to the system and/or displayed on the display screen of the reading terminal.

In 510, the reading terminal scans a transponder of an object by sending out an interrogation signal to an area of the reading terminal. The transponder then responds with data contained therein. Such data may include an identifier. The transponder identifier may be used to query the database as is discussed in more detail below with regard to block 512.

The identifier may be any data associated with or identifying the object and/or transponder. For example, the identifier may be an alphanumeric code (e.g., a product code) that, when read, is understood to indicate that the object is jeans having certain parameters (e.g., brand, color, size, price, etc.). It should be noted that the identifier may be encoded and as such, the reading terminal (or another computing device) may decode the encoded data to determine the identifier.

In 512, the reading terminal determines or obtains category data associated with the object. This may be accomplished by the reading terminal querying the database with the transponder identifier, which would then return category information associated with such identifier. The database contains database entries that contain category information associated with each object identifier. The reading terminal transmits a query for category data along with the identifier determined from the scanned transponder. The database then returns the category data, and the reading terminal assigns the detected inventory items to the returned category 500.

As described above in reference to FIG. 4, each inventory item (404, 405, 406, etc.) can be assigned to multiple categories 500. For example, jeans may be assigned to a "jeans" category or a "pants" category, while short sleeve shirts may be assigned to a "shirts" category or "short sleeve shirts" category. These categories may be predefined so that the categories are predetermined prior to the inventory being assigned to the categories.

Referring back to FIG. 5, at 514, the process obtains a one or more images, each image corresponding to one of the categories 500. The images may be obtained from a database. The database contains database entries that contain at least one image for each category for each respective object scanned (as each of the images is different from each other). For example, for the category of jeans made by Company X, there may be a particular image displayed, while there may be a different image associated with the general category of jeans made by Company Y.

As described above in relation to FIG. 4, the database may be a remote database 401 or a local database 402. The remote database may be a database that is stored on a computer communicative with the reading terminal over a network while the local database may be a database residing on the memory of the reading terminal.

At 516, a list of the scanned objects, relevant categories of the objects, and corresponding images of the objects obtained from the database may be displayed on the display screen of the reading terminal 100. An example of information related to the display screen and the information displayed thereon is illustrated at and discussed below with regard to FIG. 6. In this regard, the objects or items scanned may each be displayed on the display screen with a corresponding image according to one embodiment. This may be a display where a listing of items scanned is displayed sequentially on the display screen. Each line may represent a different item scanned and on each line, the display may show a graphical representation of the item as well as a textual description of that item (e.g., category, name, color, size, brand, etc.). In another embodiment, only one image may be presented on the display screen for each category of items displayed and associated with the single image for that category may be a listing of items (or merely the number of items scanned) that falls under that category. For example, the display screen may show a picture of Company X blue jeans and state that there were 40 items founds that fall under that category. This may occur for each category.

The images displayed on the display screen may be selectable. For example, the images may have an embedded or adjacent checkbox or other activation means associated therewith to allow for a user to select an image.

In one embodiment, the interface only displays a single graphical image on the interface for each object. In this regard, the quantity and other associated data may not be displayed.

In 518, the reading terminal 100 determines whether the scanned objects that are displayed on the interface are each assigned to the same category set. In this regard the scanned items that are displayed on the interface may be exact duplicates of one another or have at least one shared feature (e.g., same color, size, brand, etc.) as defined by the user. If one or more of the displayed scanned objects are not in the same category (e.g., an object is in the "jeans" category while another object is in the "shirts" category), the process may proceed from 520. If all items displayed on the interface are in the same category, the process 500 may proceed back to 508 to continue scanning fixture for additional objects/transponders.

At block, 520, the reading terminal notifies the user that the scan results in displayed objects under multiple categories and category filtering may be necessary to narrow the items that belong to a single category. A user interface may be presented on the display of the reading terminal 100 for the user to select/deselect objects to be displayed on the reading terminal in response to scanning the transponders on the fixture.

It should be noted that the scanning may be interrupted at any time by the user to stop scanning so that the user can filter the objects displayed. The user can then resume scanning as desired. In one embodiment, the user can filter the categories (and thus, filter the objects displayed) in real-time (i.e., while the reading terminal is scanning the transponders of the objects on the fixture).

In 522, the system determines whether a filtering command (e.g., confirmed the selection or deselection of one or more categories using the displayed images on the display screen) has been entered by a user and received by the reading terminal. The command may be a request generated by the reading terminal in response to the user activating a button or the like with the reading terminal using a communication interface. The command and/or request is indicative of the user desiring to filter the scanned objects to identify items falling under the selected category(ies).

As mentioned above, the user may select or deselect images using the displayed images on the display screen. This may be accomplished by selecting on the screen a checkbox or other portion of the interface associated with each respective image. In one embodiment, the user can select the particular image of interest (e.g., an image of jeans) and the reading terminal would receive such selection. The user may select multiple images if the user wishes to display objects pertaining to multiple categories. Regardless, after the user provides the category selection(s), the user provides an indication that the user has completed the filtering command/request by submitting the selections to the reading terminal.

In response to receiving the filtering command/request, the process may proceed to 524 where the reading terminal applies a category filter using the selections submitted by the user. In this regard, the reading terminal only displays on the display screen objects associated with those transponders that have been scanned and that are associated with the categories selected by the user via the filtering command/request. As such, the user can selectively display the objects on the display screen by selecting the images corresponding to specifically-desired categories.

In applying the category filter, the reading terminal hides (or otherwise removes) the data associated with those categories that were not selected (or deselected) by the user. In this regard, the data displayed on the display screen is then removed by the reading device so that the only data displayed is associated with the selected images and corresponding category(ies). If the user wishes to unhide the hidden objects, the user may select an option to allow all categories (and thus, images to all scanned objects) to be displayed.

After (or while) the category filter is/has been applied, the process 500 may proceed back to block 508 to continue scanning transponders of objects remaining on the fixture. If the reading terminal determines if there are more items to scan, the remaining unscanned objects are scanned. If there are no remaining items to scan (e.g., the reading terminal is determines that the scan is complete because all responses to the interrogation signals have already been received and processed), the process 500 may proceed to 532 and the inventory report is submitted (e.g., to the display screen or to another destination).

Blocks 510-524 are performed until all transponders have been scanned/reconciled or if the user has stopped the scanning, according to some embodiments.

Figure 6:
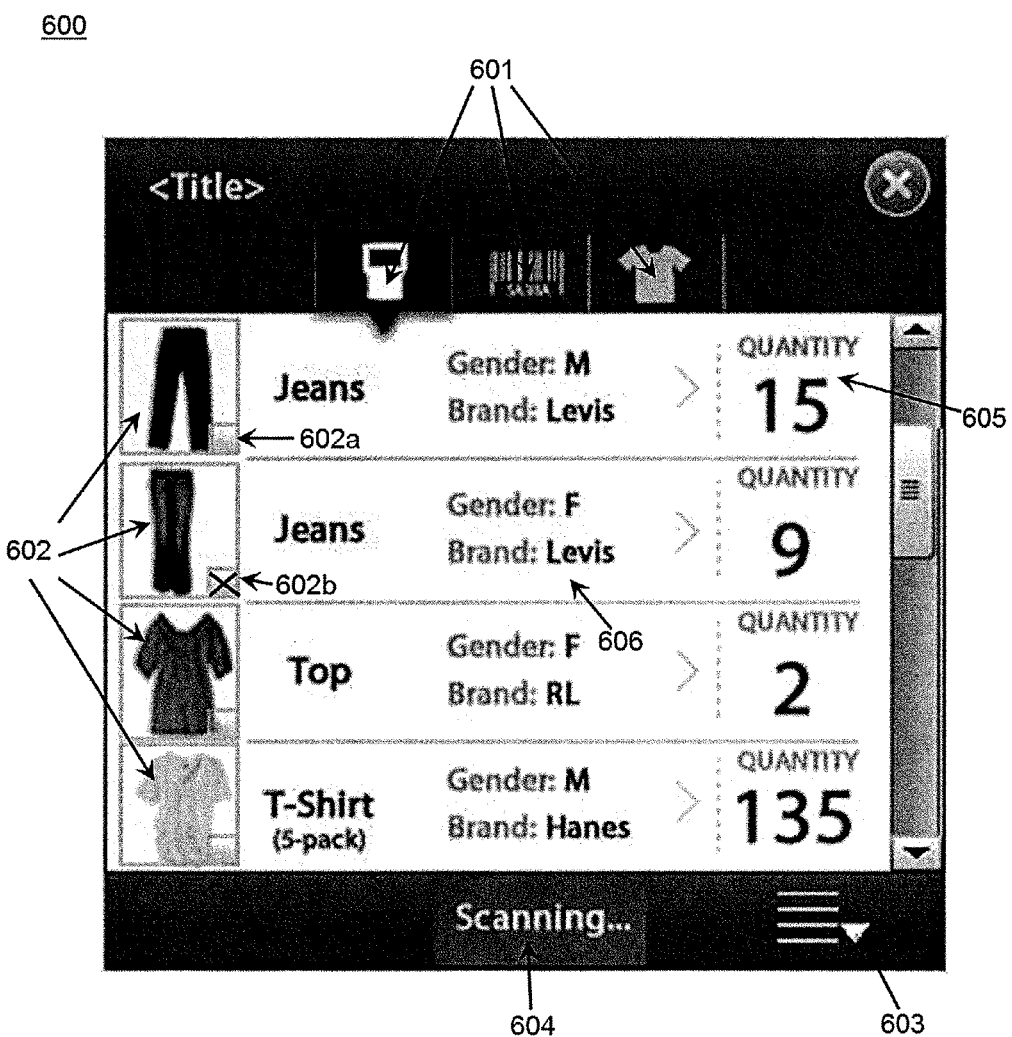
FIG. 6 depicts a screen shown on a reading terminal providing images to a user, according to one embodiment.

FIG. 6 illustrates one embodiment of a graphical user interface 600 on the display screen of the reading terminal 100. The interface 600 is used to display images and a listing of objects where the transponder thereof has been scanned. As illustrated, at least four different types of objects (i.e., female Levis jeans, male Levis jeans, RL tops, and Hanes shirts) on a fixture have been (or are currently being) scanned. These objects are displayed on the interface along with an image 602 associated with each particular category. The user can scroll in the interface to view the other category of objects scanned.

The interface 600 allows for the user to select/deselect images to filter the categories of items to be displayed on the display screen. The interface 600 may include a plurality of tabs 601 which a user can select to change interfaces and modes for the reading terminal 100. For example, FIG. 6 illustrates that the RFID scanning mode has been selected. As such, the reading terminal scans for transponders on a fixture under this portion of the interface. The other tabs 601 may correspond to a barcode scanning portion and a database access tool.

In one embodiment, the interface 600 includes images 602, where each image 602 indicates a different category. Each image may include a selection indication box 602a (e.g., a checkbox) which allows the user to select/deselect the image (and thus, the category corresponding to the image). As illustrated in FIG. 6, an image 602b associated with female Levis jeans has been checked. In this regard, the user has indicated that she would like the interface to only display those objects that have been scanned that fall under the "female Levis jeans" category. When the user applies the selection of this category, only the objects (in this case 9 objects) will be shown on the interface. In this regard, the men's jeans, tops and t-shirts will not be displayed on the interface.

In addition to the image provided in the interface, the interface may also display additional information 606 (e.g., brand, color, size, and/or any other information pertinent to the object). In one embodiment, the category may also include quantity information 605 which relates to how many objects falling with that category have been scanned. The interface 600 may also indicate the current status 604 of the reading terminal 100 (e.g., "scanning," "paused," "completed," "error," etc.) and provide further options 603 (e.g., a button for starting/stopping scanning, etc.).

Figure 7:
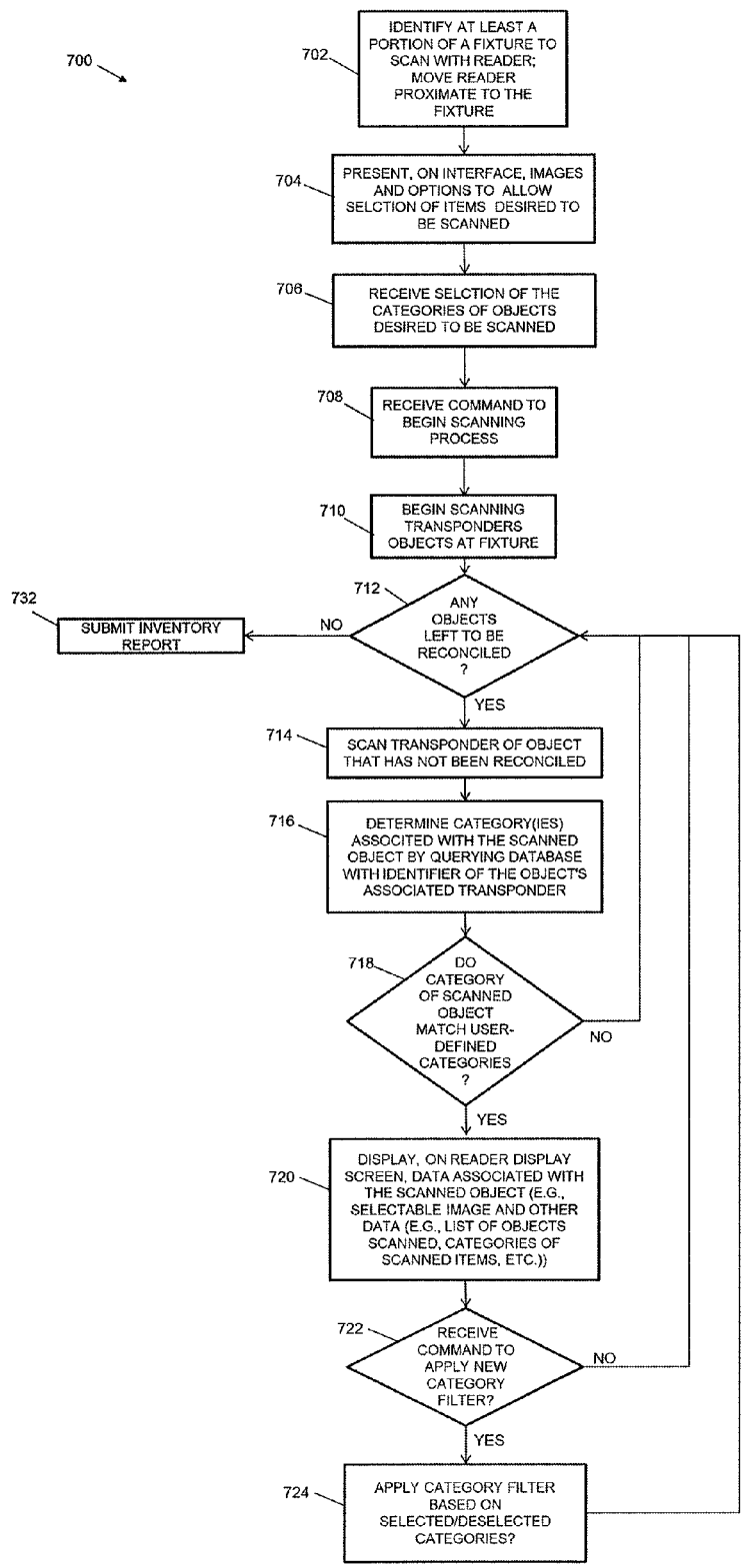
FIG. 7 is a flowchart for filtering inventory objects using a reading terminal, according to another embodiment.

Another embodiment of a method 700 for filtering inventory is illustrated in FIG. 7. At 702, a user identifies a fixture and/or a portion of a fixture to scan similar to block 502 of FIG. 5.

At 704, an interface is presented to the user to select items that the user desires to scan. The interface may be an interface which allows the user to browse all possible categories. The reading terminal queries the database to determine the categories to present to the user. The list of categories is, therefore, obtained from the database and is associated with object data stored on the database. Corresponding images are also obtained from the database. The interface displays both the images and categories. For example, the interface may display an image of jeans cut for females are illustrated with the category "female Levi jeans" after obtaining such data from the database. The image presented may be selectable so that the user can select a category using the image. In one embodiment, a checkbox or other selectable device may be provided for each category so that the user can select the particular category.

It should be understood that multiple categories may be selected or only one category may be selected. For example, the user may select only the "female Levi jeans" category so that only jeans matching this category are displayed.

In block 706, the reading terminal receives a selection of the categories of objects desired to be scanned (e.g., from a user providing such selection via the interface on the display). The reading terminal saves such information in memory for use with regard to block 718.

Blocks 708-716 correspond to blocks 504-512 of FIG. 5 in that a command or request is received and transponders are scanned. A transponder of an object is scanned in block 714 and, in block 716, the category of the scanned object is determined by querying the database with the transponder's identifier.

At block 718, the reading terminal (or other device) determines if the category associated with the scanned object in the database matches the user-selected categories (selected in block 706). The reading terminal may compare the selected categories with the category of the scanned object. If a match is determined, the process 700 may proceed to 720; otherwise the process 700 may proceed back to 712 where the next transponder is scanned.

At 720, the scanned object is displayed on the interface of the display screen (along with other displayed objects if any previously-scanned objects are already displayed and which match the selected category). This allows the reading terminal to build a list of scanned objects which match the categories selected by the user (using images of the categories/objects). Other data may also be displayed on the interface similar to block 516 discussed above with reference to FIG. 5.

Blocks 722-724 are similar to block 522-524 of FIG. 5. In this regard, the user may change or add any additional categories to the currently-selected categories if desired. This way, the user can change the objects desired to be displayed or scanned during the scanning process. If the user does not desire to change/add categories, the process 700 may proceed back to block 712 and block 714 where each additional unscanned object is scanned. Thus, the process of blocks 712-720 is repeated until all objects have been reconciled.

In one embodiment, the reading terminal may be able to determine the identifiers that should be scanned during the scan by querying the database prior to block 708. In this regard, the reading terminal could query the database for all items corresponding to the selected categories. In response thereto, the database would forward to the reading device the transponder identifiers that are associated with the selected categories. Then, during the RFID scanning procedure, if each transponder's identifier does not match one of the identifiers downloaded from the database, the reading terminal would not access additional information about that transponder or the object associated therewith and thus, would not display the object on the interface.

It should be noted that the fixtures can be any physical structure configured to support objects with transponders, such as shelving units, linear clothing racks, non-linear clothing racks, tables with one or more surfaces, or any combination thereof.

In light of the above, a user is allowed to select an image to filter objects that are displayed on the interface to the user. This allows an ease of filtering items because the user can visually ascertain which objects should be filtered in a quick manner. The user need not read textual data to determine which items should be filtered. Additionally, the images may match with the ones that the user is viewing on the fixture to be scanned and thus, an image provided directly to the user on the reader may be advantageous. Moreover, the images may be selectable, adding to further ease of filtering. A user who cannot read or understand the language presented may be able to scan using the images as discussed herein. Regardless, embodiments of the present disclosure provide a more efficient and more effective means of filtering scanned data, especially in an inventorying context.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the disclosure. The embodiments were chosen and described in order to best explain the principles of embodiments of the invention and the practical application, and to enable others of ordinary skill in the art to understand embodiments of the invention for various embodiments with various modifications as are suited to the particular use contemplated.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain principles and practical applications of the invention, and to thereby enable others skilled in the art to best utilize the invention and various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims of the present invention. The following claims are in no way intended to limit the scope of embodiments of the invention to the specific embodiments described herein.

What is claimed is:

1. A method comprising:
    receiving data from one or more transponders in response to an interrogation signal transmitted from an RFID reader, each of the one or more transponders is associated with an object;
    identifying a category for each object associated with the one or more transponders;
    displaying an image for each identified category on a user interface of the RFID reader;
    receiving a selection from a user of one of the displayed images via the user interface; and
    identifying at least one transponder of the one or more transponders that are associated with the selected object category; and
    presenting data associated with the identified at least one transponder.

2. The method according to claim 1, wherein the one or more transponders are associated with objects disposed on a fixture.

3. The method according to claim 1, further comprising obtaining on a database the image for each type of object, wherein the database is stored locally on reading terminal.

4. The method according to claim 1, wherein the scanning of the one or more transponders is performed by scanning radio frequency identification (RFID) tags affixed to each object.

5. The method according to claim 1, wherein the user selects the image presented on the interface.

6. The method according to claim 1, wherein the images and categories are pre-stored on a database in database entries associated with each object.

7. The method according to claim 1, wherein the scanning the transponders occurs after the receiving the selection of the object category.

8. The method according to claim 1, further comprising obtaining an identifier for each scanned transponder, wherein the obtaining the image comprises querying a database with each identifier received from a scanned transponder so that the obtained images are obtained using the transponder identifiers.

9. The method according to claim 1, wherein the user interface comprises at least one of a display, a keyboard, or voice recognition.

10. The method according to claim 1, wherein the presenting comprises presenting, via a presenting device, data associated with the identified one or more transponders, wherein the presenting device comprises at least one of voice activation device or a head's up display that presents data without requiring a user to look away from the user's usual viewpoint.

11. A method comprising:
    scanning, using an antenna, a transponder in an area where the transponder is associated with an object;
    determining a category associated with the transponder or the object;
    receiving a selection of a category via a user interface from a user; and
    identifying the transponder as associated with the category in response to determining that the transponder is associated with the selected category.

12. The method of claim 11, further comprising obtaining the image from a database, wherein the database comprises a database entry comprising an indication of the image associated with the category, the category associated with the object, and data identifying the object.

13. The method of claim 11, wherein the scanning occurs in response to the receiving the selection of the category.

14. The method of claim 11, further comprising displaying objects associated with the identified transponder, and sending a report of the displayed scanned object.

15. The method of claim 11, further comprising:
    obtaining an identifier of the scanned transponder, and
    obtaining the image comprises querying a database with an identifier received from a scanned transponder so that the obtained images are obtained using the transponder identifier.

16. The method of claim 11, wherein the image is presented along with other images from a database to provide to the user for selection.

17. A method comprising:
    transmitting a radio frequency (RF) interrogation signal from an RFID reader;
    receiving at least one RF response signal from one or more transponders in response to the interrogation signal, wherein the one or more transponders are associated with respective items;
    identify a type of item associated with each of the one or more transponders from which the RFID reader received the at least one RF response signal;
    obtain an image for each type of item identified by the RFID reader;
    present the image for each type of item identified via an interface;
    receive a selection of an image that is associated with a particular type of item; and
    display data associated with each of the one or more transponders that is associated with the particular type of item associated with the selected image.

* * * * *